(12) United States Patent
Engstrand

(10) Patent No.: US 7,456,385 B2
(45) Date of Patent: Nov. 25, 2008

(54) SYSTEM AND METHOD FOR DETECTING AN END OF AND/OR A BEGINNING OF A STROKE

(75) Inventor: Bradley Engstrand, Hartford, WI (US)

(73) Assignee: Phaedrus, LLC, Hartford, WI (US)

( * ) Notice: Subject to any disclaimer, the term of this patent is extended or adjusted under 35 U.S.C. 154(b) by 211 days.

(21) Appl. No.: 11/416,685

(22) Filed: May 3, 2006

(65) Prior Publication Data

US 2007/0075227 A1 Apr. 5, 2007

Related U.S. Application Data

(63) Continuation-in-part of application No. 11/242,799, filed on Oct. 3, 2005, now Pat. No. 7,294,823.

(51) Int. Cl.
*G01D 5/34* (2006.01)
*F01B 25/26* (2006.01)
*F02M 51/00* (2006.01)

(52) U.S. Cl. .................. 250/231.1; 91/1; 123/478

(58) Field of Classification Search ............. 250/231.1, 250/573; 73/1.19, 1.22; 91/1; 324/686; 123/478

See application file for complete search history.

(56) References Cited

U.S. PATENT DOCUMENTS

| | | | |
|---|---|---|---|
| 3,368,751 A | 2/1968 | Merill | |
| 3,885,872 A | 5/1975 | Howe, Jr. et al. | |
| 4,150,299 A | 4/1979 | Kasiewicz et al. | |
| 4,488,528 A | * 12/1984 | Morikawa | 123/406.26 |
| 4,501,642 A | 2/1985 | Wells | |
| 4,661,695 A | 4/1987 | Mori et al. | |
| 4,736,674 A | 4/1988 | Stoll | |
| 4,806,707 A | 2/1989 | Landmeier | |

(Continued)

OTHER PUBLICATIONS

U.S. Appl. No. 11/238,893, filed Sep. 9, 2005, Engstrand.

(Continued)

*Primary Examiner*—Thanh X Luu
(74) *Attorney, Agent, or Firm*—Patents+TMS, P.C.

(57) ABSTRACT

A system and a method detect that a movable element within an interior of a compartment is at an end of a stroke and/or a beginning of the stroke within the interior of the compartment. A switch and/or an electrical circuit is connected to the compartment for detecting that the movable element may be at the beginning of and/or at the end of the stroke. A microprocessor is connected to the switch or to the electrical circuit for detecting that the movable element is at the end of and/or at the beginning of the stroke within the interior of the compartment. An end cap having a light detector is connected to the compartment to measure an intensity of the light within an interior of the end cap which is attenuated by and/or is diffused by a surface of the movable element and/or of the compartment. The intensity of the light within the interior of the end cap corresponds to a position of the movable element within the interior of the compartment. The light detector determines the position of the movable element which is at the end of the stroke, at the beginning of the stroke and/or between the end of the stroke and the beginning of the stroke via the intensity of light within the interior of the end cap.

9 Claims, 6 Drawing Sheets

U.S. PATENT DOCUMENTS

| | | |
|---|---|---|
| 4,902,903 A | 2/1990 | Sergson et al. |
| 4,970,361 A | 11/1990 | Fuse |
| 5,182,979 A | 2/1993 | Morgan |
| 5,231,959 A | 8/1993 | Smietana |
| 5,271,505 A | 12/1993 | Low |
| 5,705,742 A | 1/1998 | Fox et al. |
| 5,744,705 A | 4/1998 | Derouen et al. |
| 5,799,626 A | 9/1998 | Ponsford et al. |
| 5,977,778 A | 11/1999 | Chan et al. |
| 5,988,676 A | 11/1999 | Lotito et al. |
| 6,058,776 A | 5/2000 | Algers et al. |
| 6,170,573 B1 | 1/2001 | Brunet et al. |
| 6,484,620 B2 * | 11/2002 | Arshad et al. ............... 92/5 R |
| 6,952,009 B1 | 10/2005 | Engstrand |

OTHER PUBLICATIONS

U.S. Appl. No. 11/242,799, filed Oct. 3, 2005, Engstrand.

* cited by examiner

SYSTEM AND METHOD FOR DETECTING AN END OF AND/OR A BEGINNING OF A STROKE

This application is a Continuation-In-Part application of U.S. patent application Ser. No. 11/242,799 filed on Oct. 3, 2005 now U.S. Pat. No. 7,294,823.

BACKGROUND OF THE INVENTION

The present invention generally relates to a system and a method for detecting an end of and/or a beginning of a stroke. More specifically, the present invention relates to a system and a method for detecting an end of and/or a beginning of a stroke for a movable element and/or a rod of the movable element within an interior of a compartment. A tube, a switch and/or an insulator may be attached to the compartment to contact the movable element at the end of and/or at the beginning of the stroke within the interior of the compartment. The switch may be, for example, a mechanical switch, an electrical switch and/or a magnetic switch. The movable element may contact and/or may abut the tube within the interior of the compartment to open or to close the switch for signaling that the movable element may be at the end of and/or at the beginning of the stroke. A microprocessor may be connected to the switch for detecting that the movable element may have opened or may have closed the switch within the interior of the compartment. As a result, the microprocessor may detect that the movable element may be at the end of and/or at the beginning of the stroke via the switch within the interior of the compartment.

An end cap may be attached to an end of the compartment for connecting a light source and/or one or more light sensors to the compartment. One or more light sensors may be located within an interior of an end cap for measuring an intensity of light within the interior of the end cap and/or of the compartment. A platform and/or a cover may prevent the light transmitted by the light source from being directed towards one or more light detectors within the interior of the end cap. Interior walls of the compartment and/or a surface of the movable element may absorb, may diffuse and/or may attenuate an amount of light emitted by the light source which may correspond to a position of the movable element between the end of and the beginning of the stroke. One or more light sensors may measure an intensity of the light within the interior of the end cap which may correspond to and/or may be based on the position of the movable element between the end of the stroke and the beginning of the stroke. Interior walls of the compartment and/or the cap and/or the surface on the movable element may reduce, may minimize and/or may prevent diffraction of the light within the interior of the compartment and/or of the cap.

It is, of course, generally known to measure and/or to detect a position of a movable element within an interior of a cylinder. Typically, a sensor within the interior of the cylinder may be at a location within the interior of the cylinder which is between an end of and a beginning of a stroke. The sensor contacts and/or magnetically interferes with the movable element for detecting that the movable element may be at the position between the end of and the beginning of the stroke within the interior of the cylinder.

However, the sensor is incapable of detecting that the movable element is at the end of the stroke or at the beginning of the stroke within the interior of the cylinder. Contact between the movable element and the sensor may cause the sensor to inaccurately detect the position of the movable element between the end of and the beginning of the stroke within the interior of the cylinder. Further, contact between the movable element and the sensor may wear, may damage and/or may destroy the movable element. The sensor may be inoperable or may inaccurately detect the position of the movable element between the end of the stroke and the beginning of the stroke within the interior of the cylinder. Moreover, wear or damage to the movable element may change an amount of light which may be absorbed, may be diffused and/or may be attenuated by a surface of the movable element within the interior of the cylinder. A change in the amount of light which may be absorbed, may be diffused and/or may be attenuated by the surface of the movable element may prevent the cylinder from self-calibrating via the sensor.

As the movable element and/or a rod of the movable element wears and/or is damaged, the movable element or the rod may experience a failure within the interior of the cylinder. The rod within the interior of the cylinder may be sideloaded which may cause a chrome coating on the rod to be removed from the rod as the rod moves the movable element within the interior of the cylinder. Removal of the chrome coating from the rod may cause the rod to change from a concentric shape to an oval shape or a non-concentrical shape. Without the concentric shape, the rod may force the movable element to contact interior walls of the cylinder during movement between the end of and the beginning of the stroke. As a result, the movable element may be damaged or may be destroyed by the interior walls of the cylinder which may cause a failure of the movable element within the interior of the cylinder. Moreover, the sensor may be incapable of detecting wear and/or damage to the rod and/or to the movable element for preventing failure of the rod and/or the movable element within the cylinder.

A need, therefore, exists for a system and a method for detecting an end of and/or a beginning of a stroke. Additionally, a need exists for a system and a method for detecting an end of and/or a beginning of a stroke which may provide a stop tube, a switch and/or a circuit to detect that a movable element may be located at the end of and/or at the beginning of the stroke. Further, a need exists for a system and a method for detecting an end of and/or a beginning of a stroke which may provide a microprocessor to detect that a movable element may be located at the end of and/or at the beginning of the stroke. Still further, a need exists for a system and a method for detecting an end of and/or a beginning of a stroke which may provide a light source and/or one or more light sensors to determine a position of a movable element within an interior of a compartment. Moreover, a need exists for a system and a method for detecting an end of and/or a beginning of a stroke which may detect wear to and/or damage to a movable element or a rod within an interior of a compartment. Furthermore, a need exists for a system and a method for detecting an end of and/or a beginning of a stroke which may prevent damage to and/or failure of a movable element or a rod within an interior of a compartment.

SUMMARY OF THE INVENTION

The present invention provides a system and a method for detecting an end of and/or a beginning of a stroke. Moreover, the present invention provides a system and a method for detecting an end of and/or a beginning of a stroke for a movable element and/or a rod within an interior of a compartment. A switch and/or an insulator may be connected to the compartment for detecting that the movable element may be at the end of and/or at the beginning of the stroke within the interior of the compartment. The movable element may contact the switch to open or to close the switch for detecting that the movable element may be at the end of and/or at the beginning of the stroke within the interior of the compartment. A microprocessor may be connected to the tube for detecting that the movable element may be at the end of and/or at the beginning of the stroke within the interior of the compartment.

An end cap may be attached to an end of the compartment to connect a light source and/or one or more light sensors to the compartment. An interior of the end cap may be accessible from the interior of the compartment to project light from the light source to the interior of the end cap via the interior of the compartment. One or more light sensors may measure an intensity of the light within the interior of the cap which may not be absorbed, may not be diffused by and/or may not be attenuated by surface of the compartment and/or a surface of the movable element. The intensity of the light detected by one or more light sensors may correspond to and/or may be based on a position of the movable element within the interior of the compartment which may be located between the end of and the beginning of the stroke. As a result, one or more light sensors may determine and/or may detect the position of the movable element between the end of and the beginning of the stroke within the interior of the compartment. The end cap, the compartment and/or a platform may reduce, may minimize and/or may prevent diffraction of the light within an interior of the compartment and/or of the end cap.

To this end, in an embodiment of the present invention, a system for detecting an end of a stroke or a beginning of the stroke is provided. The system has a compartment having a body defining an interior wherein the body has an interior surface and a length defined between a first end and a second end of the compartment. Further, the system has a movable element within the interior of the compartment wherein the movable element moves within the interior of the compartment between a first position and a second position wherein the second position is adjacent to the first end of the compartment wherein the first position is located between the second position of the movable element and the second end of the compartment. Still further, the system has a switch connected to the first end of the compartment wherein the switch is located within the interior of the compartment wherein the movable element at the second position within the interior of the compartment moves the switch from an opened position to a closed position wherein the switch in the closed position identifies that the movable element is located at the second position within the interior of the compartment. Moreover, the system has a first detector connected to the first end of the compartment wherein an amount of light emitted within the interior of the compartment is attenuated and diffused by the movable element and the interior surface of the compartment wherein the first detector detects an intensity of the light within the interior of the compartment wherein the first detector identifies that the movable element is in the first position via the intensity of the light within the interior of the compartment.

In an embodiment, the system has a cap attached to the first end of the compartment wherein the first detector is located within the cap.

In an embodiment, the system has a second detector connected to the first end of the compartment wherein the second detector measures the intensity of the light within the interior of the compartment which is not attenuated by the movable element and the interior surface of the compartment.

In an embodiment, the system has a magnet attached to the first end of the compartment wherein the magnet connects the switch to the compartment.

In an embodiment, the system has a light source connected to the first end of the compartment wherein the light source emits light into the interior of the compartment.

In an embodiment, the system has a microprocessor connected to the first detector wherein the microprocessor detects that the movable element is located at the first position or the second position within the interior of the compartment.

In an embodiment, the system has an insulator attached to the interior surface of the compartment wherein the insulator is located between the switch and the interior surface of the compartment.

In another embodiment of the present invention, a system for detecting an end of a stroke or a beginning of the stroke is provided. The system has a compartment having a body defining an interior wherein the body has an interior surface and a length defined between a first end and a second end of the compartment wherein the compartment has a movable element within the interior of the compartment wherein the movable element moves within the interior of the compartment between a first position and a second position wherein the second position is adjacent to the first end of the compartment. Further, the system has an electrical circuit connected to the first end of the compartment wherein the electrical circuit has a total capacitance value wherein the movable element is moved to the second position within the interior of the compartment wherein the movable element connects to the electrical circuit at the second position wherein the movable element increases the total capacitance value of the electrical circuit. Still further, the system has a first detector connected to the first end of the compartment wherein the first detector determines an intensity of light emitted within the interior of the compartment wherein the intensity of the light detected within the compartment corresponds to the first position of the movable element within the compartment. Moreover, the system has a microprocessor connected to the electrical circuit and the first detector wherein the microprocessor detects that the movable element is located at the first position within the compartment via the intensity of the light detected within the interior of the compartment which is not attenuated by the interior surface of the compartment or the movable element wherein the microprocessor detects that the movable element is located at the second position within the interior of the compartment via the second total capacitance of the electrical circuit.

In an embodiment, the system has a tube connected to the interior surface of the compartment wherein the tube is connected to the electrical circuit.

In an embodiment, the system has a surface formed on the movable element wherein the surface of the movable element or the interior surface of the compartment attenuates the light emitted within the interior of the compartment.

In an embodiment, the system has a light source connected to the first end of the compartment wherein the light source emits the light into the interior of the compartment.

In an embodiment, the system has a second detector connected to the first end of the compartment wherein the second detector determines the intensity of the light within the interior of the compartment.

In an embodiment, the system has a tab connected to the movable element wherein the tab prevents the light from illuminating the interior of the compartment.

In an embodiment, an amount of the light emitted within the compartment is attenuated by the interior surface of the compartment wherein the amount of the light attenuated corresponds to the first position of the movable element within the compartment.

In another embodiment of the present invention, a method for detecting an end of a stroke or a beginning of the stoke is provided. The method has the step of providing a compartment having a body defining an interior wherein the body has an interior surface and a length defined between a first end and a second end wherein the compartment has a movable element located within the interior of the compartment wherein the movable element moves between a first position and a second position within the interior of the compartment wherein the second position of the movable element is adjacent to the first end of the compartment wherein the first position of the movable element is located between the second position of the movable element and the second end of the compartment. Further, the method has the step of connecting a cap to the first end of the compartment wherein the cap has a bottom surface and walls defining an interior of the cap. Still further, the method has the step of detecting an intensity of light within the interior of the cap corresponding to an intensity of light within the interior of the compartment which is not attenuated by the interior surface of the compartment and the movable element wherein the light within the interior of the compartment is diffused by the interior surface of the compartment wherein the intensity of the light detected within the interior of the cap corresponds to the first position of the movable element within the interior of the compartment. Moreover, the method has the step of detecting that the movable element is located at the second position within the interior of the compartment.

In an embodiment, the method has the step of

In an embodiment, the method has the step of determining the first position or the second position of the movable element within the interior of the compartment via a microprocessor wherein the microprocessor is connected to the compartment.

In an embodiment, the method has the step of identifying that the movable element is located at the second position within the interior of the compartment via a switch wherein the switch is located within the interior of the compartment.

In an embodiment, the method has the step of moving the movable element between the first position and the second position within the interior of the compartment.

In an embodiment, the method has the step of connecting an electrical circuit to the first end of the compartment wherein the electrical circuit identifies that the movable element is located at the second position within the interior of the compartment.

In an embodiment, the method has the step of forming a tab on the movable element wherein the tab prevents the light from illuminating the interior of the compartment.

It is, therefore, an advantage of the present invention to provide a system and a method for detecting an end of and/or a beginning of a stroke.

Another advantage of the present invention is to provide a system and a method for detecting an end of and/or a beginning of a stroke which may provide an end cap for positioning one or more light sensors adjacent to an interior of a compartment to detect a position of a movable element within the interior of the compartment.

And, another advantage of the present invention is to provide a system and a method for detecting an end of and/or a beginning of a stroke which may detect a position of a movable element within an interior of a compartment corresponding to an intensity of light of the compartment and/or within an interior of an end cap.

Yet another advantage of the present invention is to provide a system and a method for detecting an end of and/or a beginning of a stroke which may provide a switch within an interior of a compartment to detect that a movable element may be at the end of and/or at the beginning of the stroke within the interior of the compartment.

A further advantage of the present invention is to provide a system and a method for detecting an end of and/or a beginning of a stroke which may provide a tube, a light source and/or one or more light sensors to determine a position of a movable element within an interior of a compartment.

Moreover, an advantage of the present invention is to provide a system and a method for detecting an end of and/or a beginning of a stroke which may determine a position of a movable element within an interior of a compartment via an intensity of light within the interior of the compartment and/or within an interior of an end cap.

And, another advantage of the present invention is to provide a system and a method for detecting an end of and/or a beginning of a stroke which may provide an insulator between a surface of a compartment and a stop tube and/or a switch to detect that a movable element within the compartment may be at the end of or at the beginning of the stroke.

Yet another advantage of the present invention is to provide a system and a method for detecting an end of and/or a beginning of a stroke which may connect a switch to a surface of a compartment which may be opened and/or may be closed by a movable element within an interior of the compartment.

Another advantage of the present invention is to provide a system and a method for detecting an end of and/or a beginning of a stroke which may provide a bottom surface of an end cap for reflecting, for diffusing, for attenuating and/or for scattering light within an interior of the end cap inwardly with respect to one or more light detectors within the interior of the end cap.

Yet another advantage of the present invention is to provide a system and a method for detecting an end of and/or a beginning of a stroke which may locate a position of a movable element within an interior of a compartment from an intensity of light not absorbed by, diffused by, attenuated by and/or scattered by a surface of the compartment and/or of the movable element.

A still further advantage of the present invention is to provide a system and a method for detecting an end of and/or a beginning of a stroke which may connect an electrical circuit to a compartment for detecting that a movable element may be at the end of and/or at the beginning of the stroke via a total capacitance of the electrical circuit.

Moreover, an advantage of the present invention is to provide a system and a method for detecting an end of and/or a beginning of a stroke which may detect wear and/or damage to a movable element or a rod of the movable element to prevent failure of the movable element and/or the rod within an interior of a compartment.

And, another advantage of the present invention is to provide a system and a method for detecting an end of and/or a beginning of a stroke which may provide a surface on a movable element and/or on a compartment to attenuate light emitted within an interior of the compartment.

Yet another advantage of the present invention is to provide a system and a method for detecting an end of and/or a beginning of a stroke which may provide a bottom surface and/or interior walls of a cap to attenuate light emitted within an interior of the cap.

Another advantage of the present invention is to provide a system and a method for detecting an end of and/or a beginning of a stroke which may provide a surface on a movable element and/or on a compartment to reduce, to minimize and/or to prevent diffraction of light within an interior of the compartment and/or within an interior of a cap.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a system and a method for detecting an end of and/or a beginning of a stroke. A movable element may move from the end of the stroke to the beginning of the stroke within an interior of a compartment. A switch or a stop tube may be connect to a surface of the compartment to connect the switch or an electrical circuit, respectively, within the interior of the compartment for detecting that the movable element may be at the beginning of and/or at the end of the stroke. The movable element may contact the switch to move the switch between an open position and/or a closed position which may indicate and/or may determine that the movable element may be at the end of and/or at the beginning of the stroke. Alternatively, the movable element may contact a cap of the stop tube to increase a total capacitance of the electrical circuit which may indicate and/or may determine that the movable element may be at the end of and/or a the beginning of the stroke. A microprocessor may be connected to the switch or the electrical circuit to detect that the movable element may be at the end of and/or at the beginning of the stroke within the interior of the compartment.

An end cap may be attached to the compartment for connecting a light source and/or one or more light detectors to the compartment. A tab may be formed on the movable element to block the light from being projected from the light source with the movable element at the end of or at the beginning of the stroke. One or more light detectors may measure an intensity of the light within the interior of the end cap which may not be absorbed, may be diffused and/or may be attenuated by the movable element and/or by the compartment. The intensity of the light within the interior of the end cap may correspond to a position of the movable element within the interior of the compartment. The end cap and/or the compartment may reduce, may minimize and/or may prevent diffraction of the light within the end cap and/or the compartment from being. One or more light detectors may determine the position of the movable element which may be at the end of the stroke, at the beginning of the stroke and/or at the position between the end of the stroke and the beginning of the stroke.

Figure 1:
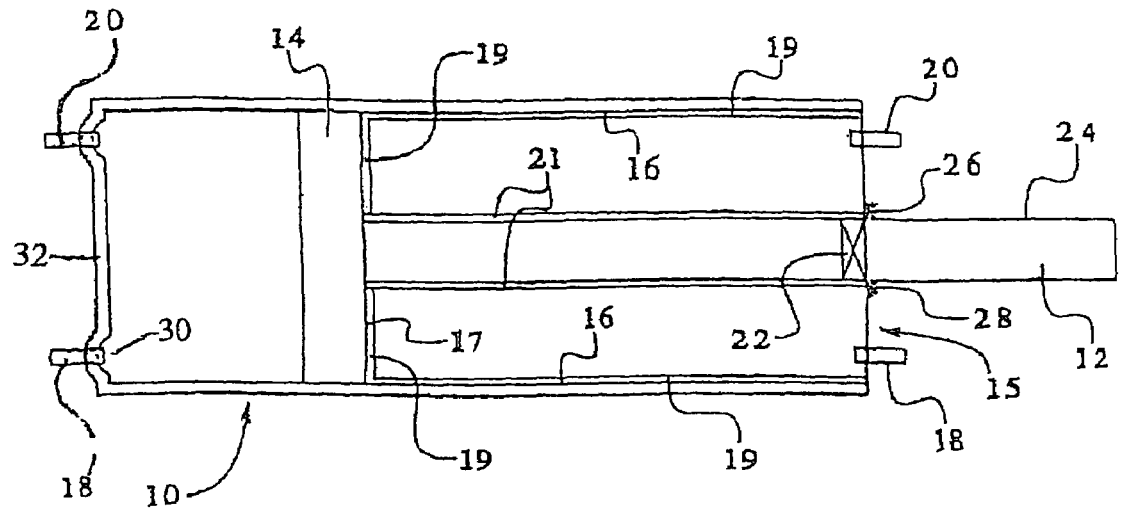
FIG. 1 illustrates a cross-sectional view of a cylinder showing sensor placement and cleaning elements of an embodiment of the present invention.

Referring now to the drawings wherein like numerals refer to like parts, FIG. 1 illustrates a cylinder machine element 10 having a shaft element 12 and a head 14 that operates cooperatively with the cylinder 10 in a manner well-known to one of ordinary skill in the art. The cylinder 10 may preferably be hydraulic or pneumatic. The cylinder 10 may also be any other type of cylinder known to one of ordinary skill in the art.

The cylinder 10 further may have an end wall 15 that may be perpendicular to the shaft 12 and that may substantially enclose the cylinder 10. The end wall 15 may surround the shaft 12. A light source 18 may be positioned on the end wall 15 of the cylinder 10 with the light from the light source 18 projecting into the interior of the cylinder 10. The light source 18 may be an LED light source or any other light source known by those skilled in the art. In addition, a light sensor 20 may also be placed on the end wall 15 of the cylinder 10 with the detecting portion of the sensor 20 directed towards the interior of the cylinder 10. The light sensor 20 measures the intensity of light within the cylinder 10 emitted by the light source 18 into the interior of the cylinder 10.

The cylinder 10 has an interior wall 16. The interior wall 16 may be coated with a substance 19 that may absorb, may diffuse and/or may scatter a portion of the light emitted from the light source 18. The substance 19 may be an anodizing compound. The substance 19 may reduce, may minimize and/or may prevent diffraction of the light emitted from the light source 18. The surface 17 of the head 14 may also be coated with the substance 19 or may be covered with a nitrile compound or other coating known by those skilled in the art to be light absorbing. Furthermore, the surface 24 of the shaft 12 may also be coated with a light absorbing substance 21 such as a nitrile compound, ceramic compound, or any other compound known by those skilled in the art to be coated onto a shaft that may also provide light absorbing, light diffusing, light attenuating and contaminant preventative properties. The substances 19, 21 may have various colors that may affect and/or control the amount of light absorption.

As the head 14 and the shaft 12 transpose through the cylinder 10, a portion of the light emitted from the light source 18 may be absorbed by the coating 19 on the interior wall 16. A portion of the light emitted by the light source 18 may be absorbed, may be diffused, may be attenuated and/or may be scattered by the coating 19, 21 on the head surface 17. Lastly, a portion of the light emitted by the light source 18 may be absorbed, may be diffused, may be attenuated and/or may be scattered by the coating 21 on the shaft surface 24. The light sensor 20 measures the intensity of light within the interior of the cylinder 10 that is not absorbed by, is diffused, is attenuated and/or is scattered by the coatings 19, 21. The light sensor 20 may then transmit a signal indicative of the intensity to a processor 104, represented in FIG. 2. The processor 104 may be programmed to translate the measured intensity of the light emitted by the light source 18 that is within the cylinder 10 into a position measurement of the head 14 or shaft 12 within the cylinder 10.

In an alternate embodiment of the present invention, the cylinder 10 may have a groove 30 within an interior of an opposing end wall 32. Located within the groove 30 may be an additional light source 18 and/or an additional sensor 20. An advantage of placing the additional light source 18 and the additional sensor 20 within the groove may be to prevent the shaft element 12 and the head 14 from closing off the light path as the shaft element 12 and the head 14 move throughout the cylinder. A further advantage of placing the additional light source 18 and the additional sensor 20 within the opposing end wall 32 may be to obtain an average of two sensor readings which may provide greater accuracy in position measurement. In addition, the groove 30 may also be placed within the end wall 15 with the light source 18 and the sensor 20 placed within the groove 30.

Figure 2:
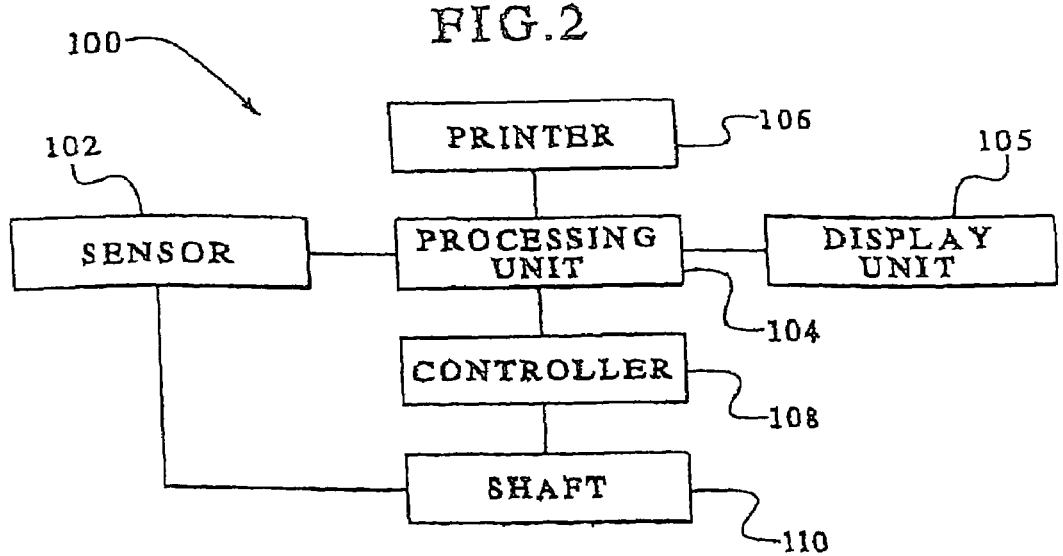
FIG. 2 illustrates a black box diagram of an embodiment of the system of the present invention.

FIG. 2 illustrates, in a black box diagram, an embodiment of a system 100 of the present invention. The system 100 includes a sensor 102 which may detect the intensity of light emitted by the light source 18 within the interior of the cylinder 10 that is not absorbed by, is diffused by, is attenuated by and/or is scattered by the coatings 19, 21 within the system 100. An output signal from the sensor 102 may be transmitted to the processor 104 for signal interpretation and/or processing. The processor 104 may determine the position of the shaft 12 or head 14 within the cylinder 10.

A display unit 105 may be provided to display the absolute or relative position of the sensed shaft 12. A printer 106 may also be provided to print the results of the absolute or relative position of the shaft 12. The processor 104 may be connected to a controller 108. After the output signal of the sensor 102 is processed by the processor 104, a signal may be transmitted to the controller 108. The controller 108 may then adjust the position of a machine element 110, such as a valve, which may affect the movement of the shaft 12 within the cylinder 10. The new position of the shaft 12 may provide the sensor 102 with a subsequent measurement which may eventually be processed by the processor 104 and may determine whether the machine element 110 may be adjusted to affect the position of the shaft 12 within the cylinder 10.

FIG. 1 also illustrates a seal 22 which may be engaged onto the shaft 12. The seal 22 may be positioned near the end wall 15 of the cylinder 10. The seal 22 may be made from, for example, rubber. A first brush 26 may be positioned near the end wall 15 of the cylinder 10 as illustrated in FIG. 1. The first brush 26 may be a wire brush, preferably made from, for example, steel or any other metal or other material known by one of ordinary skill in the art. A second brush 28 may also be positioned near the end wall 15 of the cylinder 10 diametrically opposed to the first brush 26. The second brush may be made from, for example, bronze or any other metal or other material known by one of ordinary skill in the art.

The first brush 26 and the second brush 28 may be in contact with the surface 24 of the shaft 12. As the shaft 12 moves laterally through the cylinder 10, the first brush 26 and the second brush 28 may scrape contaminants, such as weld spatter, which may be deposited onto the surface 24 of the shaft 12. By scraping contaminants from the shaft 12, the first brush 26 and the second brush 28 allow the shaft 12 to move more efficiently through the cylinder, thus providing more accurate position measurements. The coating 21 on the surface 24 of the shaft 12 may be a nitrile coating, a ceramic coating or any other coating known by those skilled in the art capable of light absorption, of light diffusing and/or of light attenuating and also capable of preventing and/or reducing the accumulation of contaminants onto a surface 24 of the shaft 12.

Figure 3:
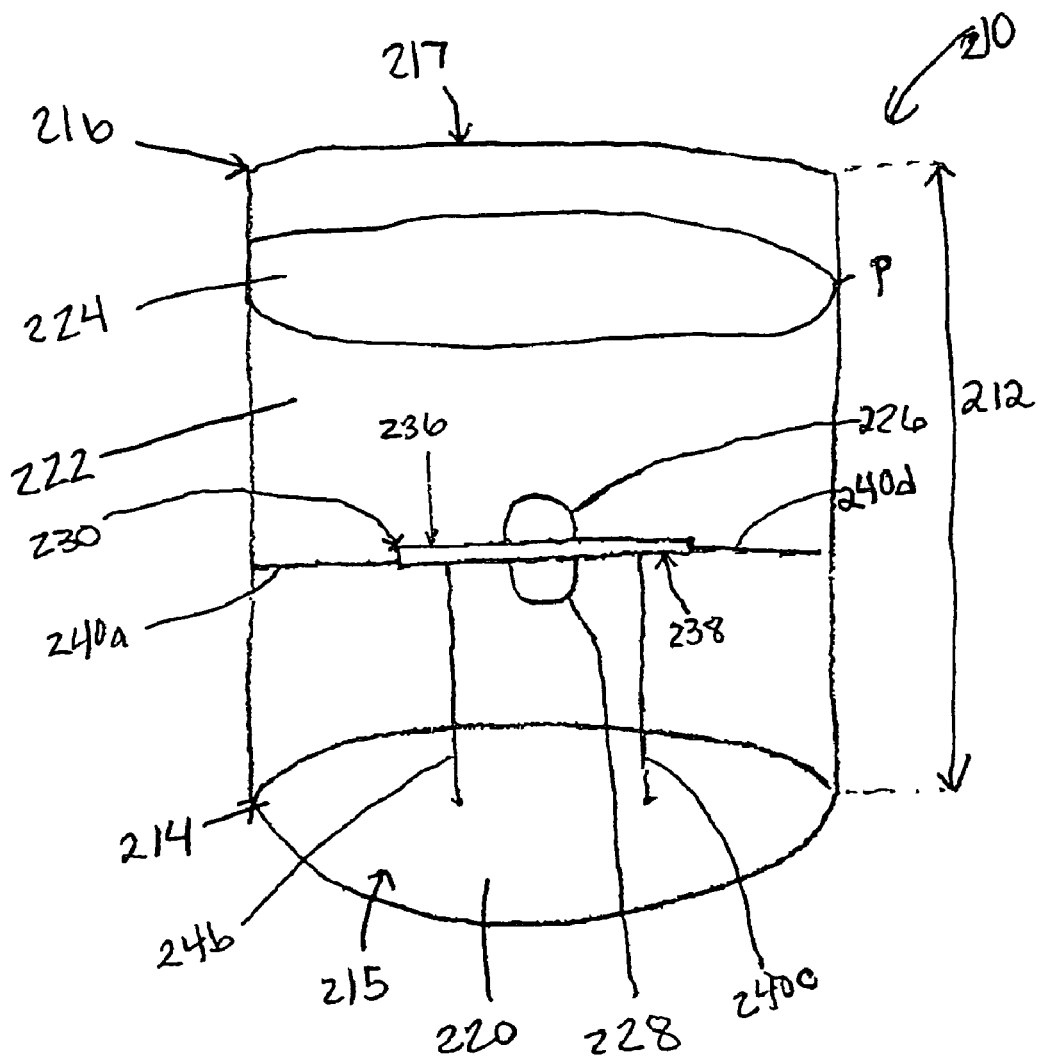
FIG. 3 illustrates a perspective view of a compartment with a movable element, a light source and a light sensor in an embodiment of the present invention.
Figure 4:
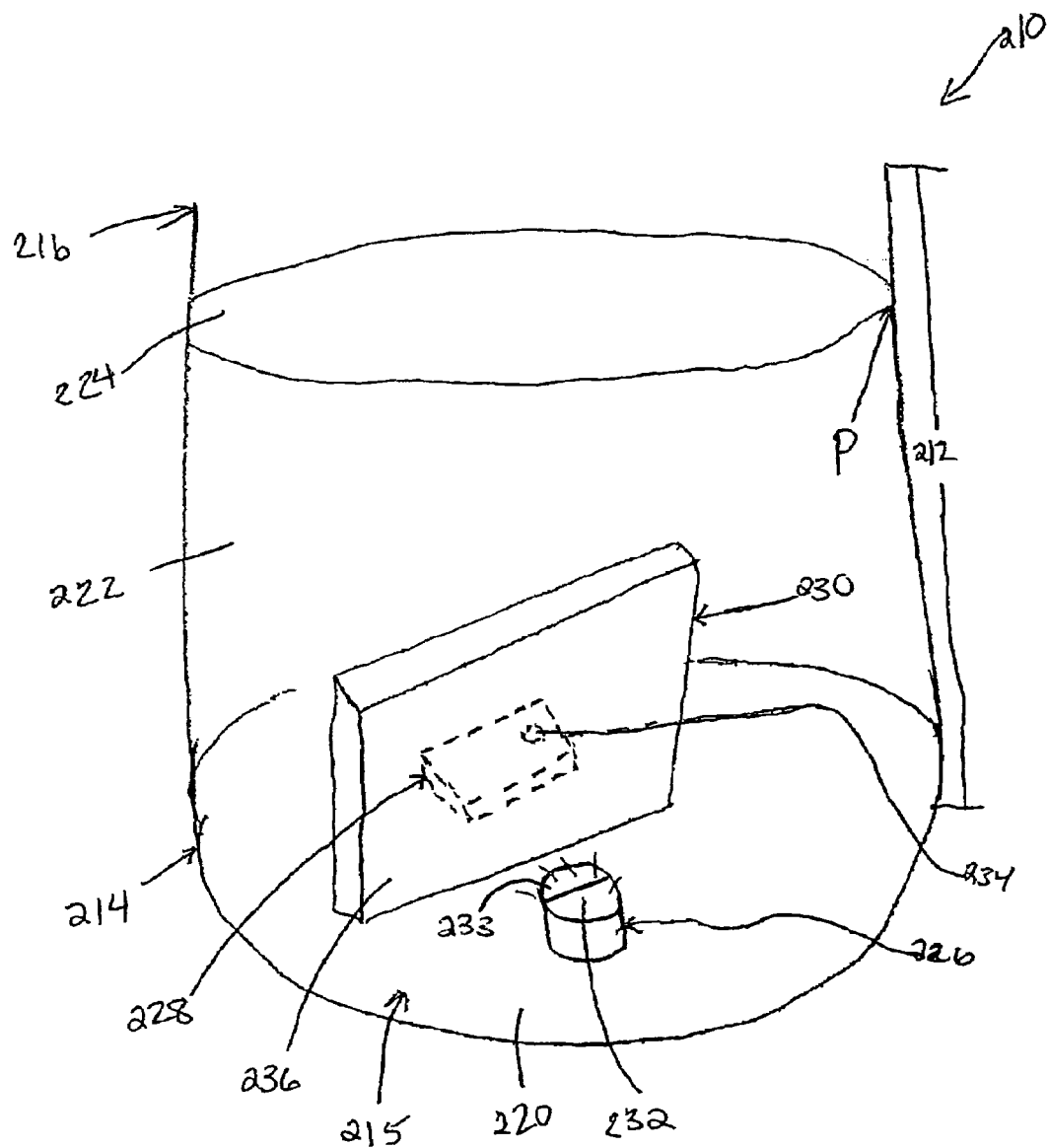
FIG. 4 illustrates a perspective view of a compartment with a movable element, a light source and a light sensor in an embodiment of the present invention.

FIGS. 3 and 4 illustrate a compartment 210 which may have a length 212 defined between a first end 214 and a second end 216. The second end 216 is opposite to the first end 214. The first end 214 and/or the second end 216 may have a first wall 215 and/or a second wall 217, respectively. The compartment 210 may have an interior surface 220 which may define an interior 222. The first wall 215 and/or the second wall 217 may be perpendicular to the interior surface 220 and/or may substantially enclose the compartment 210. The compartment 210 may be a type of cylinder, such as, for example, a hydraulic cylinder, a pneumatic cylinder and/or the like. The compartment 10 may be, for example, a hollow tube and/or the like. The present invention should not be deemed as limited to a specific embodiment of the type of the cylinder of the compartment 210.

The compartment 210 may have a movable element 224 which may be position and/or may be located in the interior 222 of the compartment 210. The movable element 224 may move in the interior 222 of the compartment 210 between the first end 214 and the second end 216. The movable element 224 may move to, may be positioned at and/or may be located at a position P in the interior 222 of the compartment 210 between the first end 214 and the second end 216. The movable element 224 may be, for example, a piston, a sphere, a tab, a flange, a spring, a magnet, a closed tube and/or the like. The present invention should not be deemed as limited to a specific embodiment of the movable element 224. It should be understood that the movable element 224 may be any movable element as known to one of ordinary skill in the art.

The interior 222 of the compartment 210 may have a light source 226, a light sensor 228 and/or a base 230. The base 230 may be located between the light source 226 and the light sensor 228. The light source 226, the light sensor 228 and/or the base 230 may be positioned on the interior surface 220 on the first end 215 of the compartment 210 and/or within the interior 222 of the compartment 210. The light source 226 may have a light emitting portion 232 directed inwardly with respect to the interior 222 of the compartment 210 as shown in FIG. 4. The light source 226 may project and/or may emit light into the interior 222 of the compartment 210. The light emitting portion 232 of the light source 226 may be, for example, an light emitting diode (hereinafter "LED"), a halogen light, a flourescent light, an incandescent light, a neon light and/or the like. The present invention may not be deemed as limited to a specific embodiment of the light source 226. It should be understood that the light source 226 may be any light source capable of projecting and/or of emitting light into the interior 222 of the compartment 210 as known to one of ordinary skill in the art.

The light sensor 228 may have a detecting portion 234 directed inwardly with respect to the interior 222 of the compartment 210 as shown in FIG. 4. The light sensor 228 may detect, may determine and/or may measure an intensity of the emitted light into the interior 222 of the compartment 210 via the detecting portion 234. Further, the light sensor 228 may detect, may determine and/or may measure a strength of the light emitted into the interior 222 of the compartment 210 via the detecting portion 234. It should be understood that the light sensor 228 may be any light sensor capable of detecting, of determining and/or of measuring the intensity of the emitted light and/or the strength of the emitted light within the interior 222 of the compartment 210 as known to one of ordinary skill in the art.

As illustrated in FIG. 3, the light source 226 may be attached to and/or may be connected to a first side 236 of the base 230. The light sensor 228 may be attached to and/or may be connected to a second side 238 of the base 230. The first side 236 is opposite to the second side 238 of the base 230. The base 230 may be attached and/or connected to the interior surface 220 of the compartment 210. Supports 240a-240d may be attached to the interior surface 220 and/or the base 230. As a result, the light source 226, the light sensor 228 and/or the base 230 may be attached to and/or may be connected to the interior surface 220 of the compartment 210. Further, the light source 226, the light sensor 228 and/or the base 230 may be located within the interior 222 of the compartment 210 via the supports 240a-240d. The supports 240a-240d may be, for example, a bar, a rod, a wire, a cable, a shaft, a pole and/or the like. The base 230 and/or the supports 240a-240b may reduce, may minimize and/or may prevent diffraction of the light within the compartment 210. The present invention may not be deemed as limited to a specific embodiment of the supports 240a-240d. It should be understood that the supports 240a-240d may have any support capable of attaching and/or connecting the base 230 to the interior surface 220 as known to one of ordinary skill in the art.

As illustrated in FIG. 4, the light source 226, the light sensor 228 and/or the base 230 may be attached to the first wall 215. The base 230 may be located between the light source 226 and the light sensor 228. The light source 226 may be adjacent to first side 236 of the base 230. The light sensor 228 may be adjacent to the second side 238 of the base 230. As illustrated in FIGS. 3 and 4, the base 230 may be interposed between the light source 226 and the light sensor 228. The base 230 may prevent light emitted from the light source 226 from being directed towards the light sensor 228. As a result, the light sensor 228 may detect an intensity of light within the interior 222 of the compartment 210. Further, the base 230 may prevent the light emitting portion 232 from being directed towards the light sensor 228.

In an embodiment, a cover 233 may be applied to, may be attached to and/or may connected to the light emitting portion 232 of the light source 226 as shown in FIG. 4. The cover 233 on the light emitting portion 232 may be adjacent to the light sensor 228 within the interior 222 of the compartment 210. The cover 233 may prevent the light transmitted from the light source 226 from being directed towards the light sensor 228. In an embodiment, the cover 233 may be, for example, a paint which may be applied to the light emitting source 232 of the light source 226. In another embodiment, the cover 233 may be made from a material, such as, for example, plastic, a film and/or an acrylic. It should be understood that the cover 233 may be any cover capable of preventing the light transmitted from the light source 226 from being directed towards the light sensor 228 as known to one of ordinary skill in the art.

The compartment 210, the interior surface 220 of the compartment 210, the base 230, the supports 240a-240d and/or the movable element 224 may be made from a material which may absorb, may diffuse and/or may attenuate an amount of the light emitted from the light source 226 and/or may have light absorbing properties. The present invention should not be deemed as limited to a specific material of the compartment 210, the interior surface 220 of the compartment 210, the base 230, the supports 240a-240d and/or the movable element 224. It should be understood that the material may be any material and/or any compound which may have light absorbing properties, light diffusing properties and/or light attenuating properties as known to one of ordinary skill in the art.

As the movable element 224 may transpose and/or may move through the compartment 210, a portion of the light emitted from the light source 226 may be absorbed by, may be diffused by and/or may be attenuated by the movable element 224, the base 230, the supports 240a-240d and/or the interior surface 220 of the compartment 210 between the movable element 224 and the first end 215 of the compartment 210. The portion of the emitted light which may be absorbed by, may be diffused by and/or may be scattered by the interior surface 220, the base 230, the supports 240a-240d and/or the movable element 226 may be based on the light absorbing properties of the material of the compartment 210, the base 230, the support 240a-240d and/or the movable element 224.

As a result, the interior surface 220, the base 230, the supports 240a-240d and/or the movable element 226 may attenuate the light within the compartment 210. The light sensor 228 may detect, may determine and/or may measure an intensity of the emitted light within the interior 222 of the compartment 210 which may not be absorbed by, which may be diffused by and/or may be scattered by the movable element 224, the base 230, the supports 240a-240d and/or the interior surface 220 between the movable element 224 and the first end 215 of the compartment 210. The intensity of the emitted light in the interior 222 of the compartment 210 may not include the portion of light which may be absorbed by, may be diffused by, may be attenuated and/or may be scattered by the movable element 224, the base 230, the supports 240a-240d and/or the interior surface 220 between the movable element 224 and the first end 215 of the compartment 210.

Figure 5:
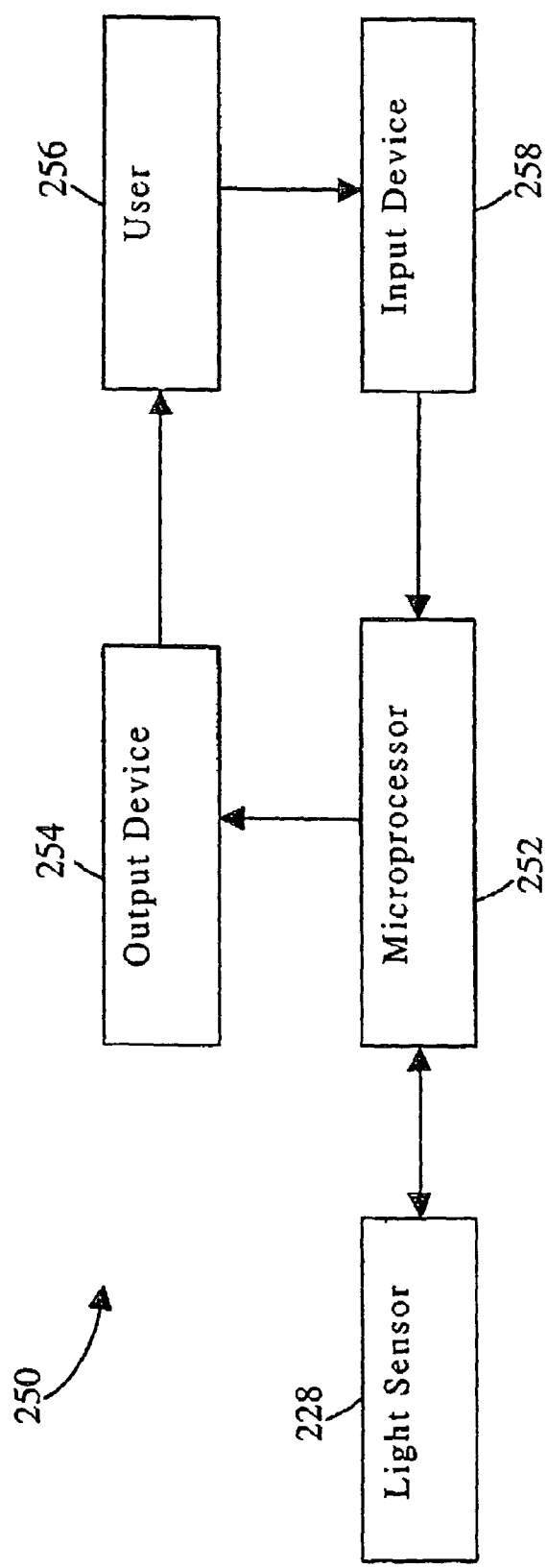
FIG. 5 illustrates a black box diagram of a system in another embodiment of the present invention.

FIG. 5 illustrates, in a black box diagram, an embodiment of a system 250 of the present invention. The light sensor 228 may be connected to and/or may be in communication with a microprocessor 252. The microprocessor 252 may be local with respect to and/or may be remote with respect to the light sensor 228. The light sensor 228 may detect, may measure and/or may determine the intensity of light emitted within the interior 222 of the compartment 210 which may not be absorbed by, which may be diffused by and/or may be scattered by the movable element 224, the base 230, the supports 240a-240d and/or the interior surface 220 between the movable element 224 and the first end 215 of the compartment 210. The position P of the movable element 224 in the interior 222 of the compartment 210 may correspond to, may relate to and/or may be indicative of the intensity of the emitted light detected by the light sensor 228 within the interior 222. The light sensor 228 may detect, may measure and/or may determine the intensity of the emitted light within the interior 222.

The light sensor 228 may transmit, may send and/or may communicate position information to the microprocessor 252. The position information may relate to, may be based on, may correspond to and/or may be indicative of the intensity of the emitted light detected by the light sensor 228 and/or the position P of the movable element 224. The microprocessor 252 may be programmed to process the position information received from the light source 228. The microprocessor 252 may be programmed to measure, to determine and/or to identify the position P of the movable element 224 in the interior 222 of the compartment 210 based on the position information received from the light sensor 228.

The microprocessor 252 may be connected to and/or may be in communication with an output device 254. The output device 254 may be local with respect to and/or may be remote with respect to the microprocessor 252 and/or the light sensor 228. The output device 254 may be a printer, a monitor, a handheld device, a speaker and/or the like. An output device 254 may display, may indicate and/or may render display information to a user 256. The display information may relate to, may correspond to and/or may be based on the position information, the intensity of light emitted and/or the position P of the movable element 224. The output device 254 may print a graph, a display, a chart and/or the like for illustrating the display information to the user 256. It should be understood that the output device 254 may be any output device capable of communicating the display information to the user 256 known to one of ordinary skill in the art.

The display information may be, for example, logarithmic, linear and/or the like. Further, the display information may be in one or more formats, such as, for example, voltages, currents, pulses, numbers and/or the like. The microprocessor 252 may be programmed to convert, to format and/or to transform the display information between one or more formats. The present invention should not be deemed as limited to a specific embodiment of the one or more formats of the display information. It should be understood that the format of the display information may be any format known to one of ordinary skill in the art.

An input device 258 may be connected to and/or in communication with the microprocessor 252. The input device 258 may be utilized by the user 256 to operate, to control and/or to instruct the microprocessor 252. The input device 258 may be a keyboard, a handheld device, a wireless portable device, a dial, a switch and/or the like. The input device 258 may be remote with respect to the microprocessor 252 and/or the output device 254. The microprocessor 252 may be programmed to receive instructions from the user 256 via the input device 258. The user 256 may select and/or may control the output device 254, the display information and/or the one or more formats of the display information via the input device 258. The present invention should not be deemed as limited to a specific embodiment of the input device 258. It should be understood that the input device 258 may be any input device capable of communicating instructions to the microprocessor 252.

Figure 6:
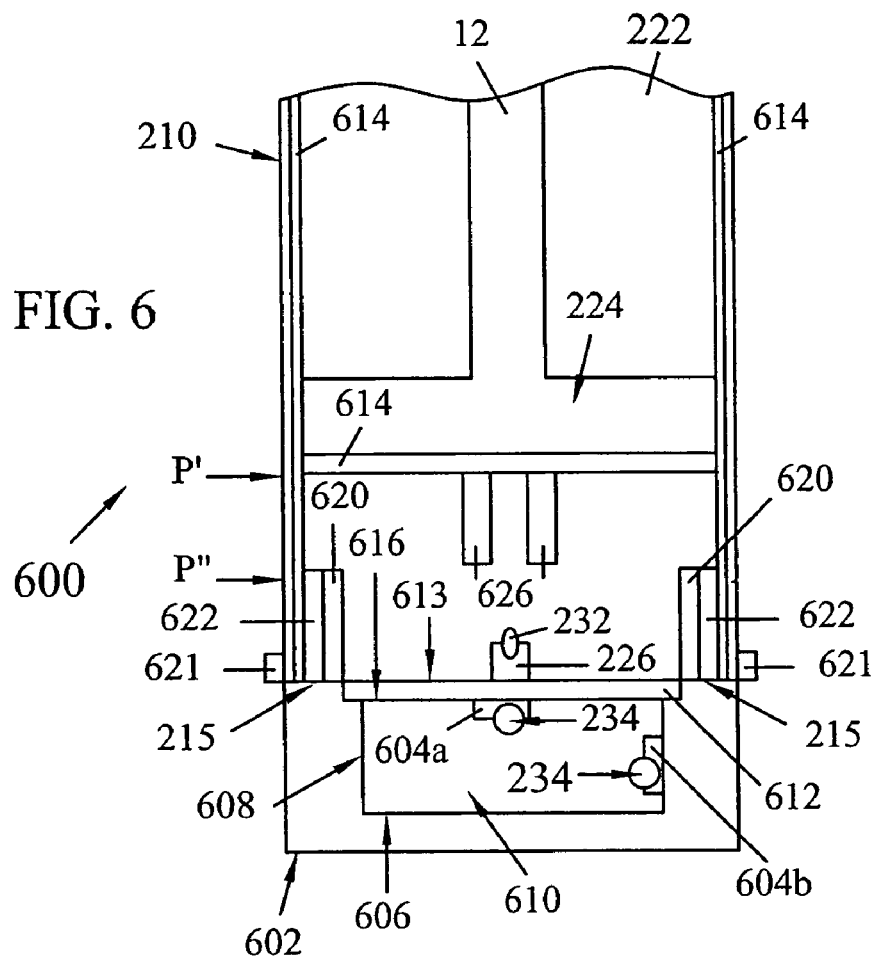
FIG. 6 illustrates a cross-sectional view of a compartment and an end cap in an embodiment of the present invention.
Figure 8:
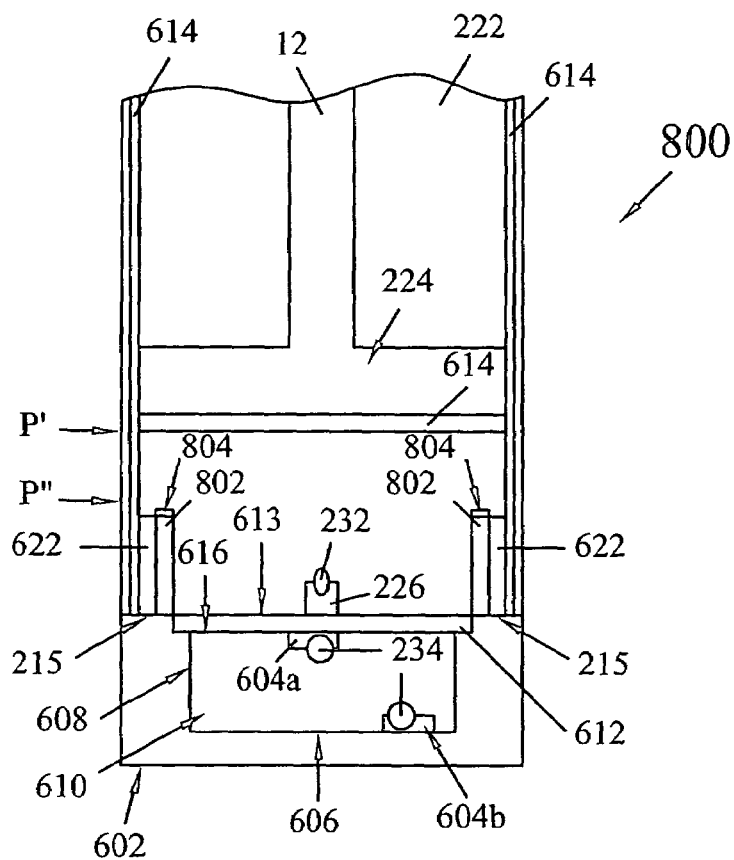
FIG. 8 illustrates a cross-sectional view of a compartment and an end cap in an embodiment of, the present invention.

In an embodiment, FIGS. 6 and 8 illustrate systems 600, 800, respectively for detecting an end of or a beginning of a stroke for the movable element 224 within the interior 222 of the compartment 210. The systems 600, 800 may have the movable element 224 which may be positioned at and/or may be located within the interior 222 of the compartment 210. The movable element 224 may moved within the interior 222 of the compartment 210 between the end of the stroke and the beginning of the stroke. The systems 600, 800 may detect a first position P' or a second position P''' of the movable element 224 within the interior 222 of the compartment 210. The first position P' of the movable element 224 may be between the end of the stroke and the beginning of the stroke of the movable element 224 within the interior 222 of the compartment 210. The second position P''' of the movable element 224 may be adjacent to the end of the stroke or the beginning of the stroke of within the interior 222 of the compartment 210.

The movable element 224 may move within the interior 222 of the compartment 210 in a first direction and/or in a second direction via the shaft 12. As a result, the movable element 224 may move between the end of and the beginning of the stroke within the interior 222 of the compartment 210 via the shaft 12. Further, the movable element 224 may move between the first position P' and the second position P''' within the interior 222 within the compartment 210 via the shaft 12. As a result, the movable element 224 may move to, may be positioned at and/or may be located at the first position P' or at the second position P''' within the interior 222 of the compartment 210 via the shaft 12. Moreover, the second position P''' may be adjacent to the first wall 215 of the compartment 210 as shown in FIGS. 6 and 8.

Figure 7:
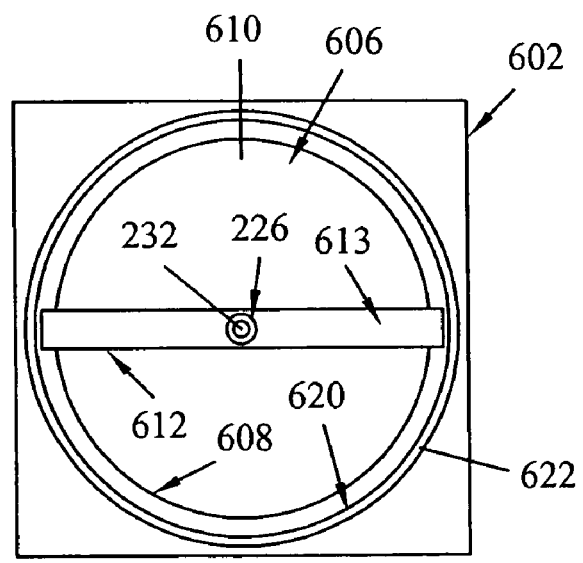
FIG. 7 illustrates a top plan view of an end cap of a compartment in an embodiment of the present invention.

The first wall 215 of the compartment 210 may be formed by an end cap 602 which may be attached to the compartment 210. The end cap 602 may be adjacent to the interior 222 of the compartment 210 as illustrated in FIGS. 6-8. Movement of the movable element 224 in the first direction or in the second direction may move the movable element 224 inwardly or outwardly with respect to the first wall 215 of the compartment 210. The end cap 602 may support, may store and/or may contain the light source 226 and a first light sensor 604*a* and/or a second light sensor 604*b* (collectively known hereinafter as "the light sensors 604*a*, 604*b*") for emitting light and/or for detecting an intensity of the light within the interior 222 of the compartment 210, respectively. The light emitting portion 232 of the light source 226 may be directed towards and/or may be located within the interior 222 of the compartment 210 for emitting, for projecting and/or for transmitting the light into the interior 222 of the compartment 210 as shown in FIGS. 6 and 8. As a result, the light source 226 may project, may transmit and/or may emit the light into the interior 222 of the compartment 210 to determine whether the movable element 224 may be located at the first position P' or at the second position P'''.

The end cap 602 may have a bottom surface 606 and interior walls 608 as illustrated in FIGS. 6-8. The interior walls 608 may be attached to and/or may be connected to the bottom surface 606 and/or may extend outwardly with respect to the bottom surface 606. The bottom surface 606 and the interior walls 608 may form and/or may define an interior 610 of the end cap 602. The interior 610 of the end cap 602 may be accessible from the interior 222 of the compartment 210. Alternatively, the interior 222 of the compartment 210 may be accessible from the interior 610 of the end cap 602. Moreover, the end cap 602 may enclose the interior 222 of the compartment 210 to seal the compartment 210. The bottom surface 606 and/or the interior walls 608 may absorb, may diffuse and/or may scatter light emitted within the interior 610 of the end cap 602. As a result, the bottom surface 606 and/or the interior walls 608 may attenuate light emitted within the interior 610 of the end cap 602. The bottom surface 606 and/or the interior walls 608 of the end cap 602 may reduce, may minimize and/or may prevent diffraction of light emitted within the interior 610 of the end cap 602.

The end cap 602 may have a platform 612 which may be attached to and/or may be connected to the interior walls 608 of the end cap 602 as illustrated in FIGS. 6-8. The platform 612 may have a first side 613 and a second side 616 which is opposite to the first side 613. The platform 612 may extend across the interior 610 of the end cap 602 and/or between the interior walls 608 of the end cap 602. The first side 613 of the platform 612 may be adjacent to the interior 222 of the compartment 210. The second side 616 of the platform 612 may be adjacent to the interior 610 of the end cap 602 and/or the bottom surface 606 of the end cap 602. Further, the platform 612 may be located between and/or may be positioned between the interior 610 of the end cap 602 and the interior 222 of the compartment 210. The platform 612 may absorb, may diffuse and/or may scatter light emitted within the interior 222 of the compartment 210 and/or within the interior 610 of the end cap 602. As a result, the platform 612 may attenuate light emitted within the interior 222 of the compartment 210 and/or within the interior 610 of the end cap 602. The platform 612 may reduce, may minimize and/or may prevent diffraction of light emitted within the interior 222 of the compartment 210 and/or within the interior 610 of the end cap 602.

A surface 614 may be formed on the compartment 210 and/or on the movable element 224 which may be adjacent to the interior 222 of the compartment 210. The surface 614 may absorb, may diffuse and/or may attenuate an amount of the light emitted within the interior 222 of the compartment 210. The surface 614 may be, for example, a coating, a finish, a texture, a light absorbing substance, a light diffusing substance and/or a light attenuating substance and/or the like. The surface 614 may be uniform, may be symmetric and/or may be continuous with respect to the interior 222 of the compartment 210 for absorbing, for diffusing and/or for attenuating the amount of the light emitted from the light source 226. As a result, the surface 614 of the compartment 210 and/or of the movable element 224 may attenuate light emitted within the interior 222 of the compartment 210. The surface 614 of the compartment 210 and/or of the movable element 224 may prevent, may minimize and/or may prevent diffraction of light emitted within the interior 222 of the compartment 210.

In an embodiment, the surface 614 of the movable element 224 and/or of the compartment 210 may be made from a first light absorbing material and/or a second light absorbing material, respectively. In an embodiment, the surface 614 may be, for example, a nitrile compound and/or a ceramic compound which may have light absorbing properties and/or light absorbing characteristics. The surface 614 of the compartment 210 and/or the movable head 224 may have various colors which may affect and/or control the amount of the light which may be absorbed, may be diffused and/or may be attenuated within the interior 222 of the compartment 210. As a result, the surface 614 may absorb, may diffuse and/or may attenuate the amount of the light emitted within the interior 222 of the compartment 210 for identifying that the movable element 224 may be at the first position P' and/or at the second position P''' within the interior 222 of the compartment 210. It should by understood that the surface 614 may be any surface which may have light absorbing properties, light diffusing properties, light attenuation properties and/or light absorbing characteristics as known to one of ordinary skill in the art.

In an embodiment, the surface 614 of the movable element 224 and/or of the compartment 210 may be formed by applying a coarse material (not shown in the figures), such as, for example, a sand paper to the surface 614. The coarse material may roughen, may scratch and/or may damage the movable element 224 and/or the compartment 210 to form the surface 614 on the movable element 224 and/or the compartment 210, respectively. As a result, the surface 614 of the movable element 224 and/or the compartment 210 may have, for example, light absorbing characteristics, light diffusing characteristics and/or light attenuating characteristics to absorb, to diffuse and/or to attenuate, respectively, the amount of the light emitted within the interior 222 of the compartment 210.

A switch 620 may be attached to and/or may be connected to the first wall 215 of the compartment 210 for detecting that the movable element 224 may be located at the second position P''' within the interior 222 of the compartment 210 as shown in FIGS. 6 and 7. The switch 620 may be located within the interior 222 of the compartment and may extend from the first wall 215 of the compartment to the second position P''' of the movable element within interior 222 of the compartment 210. The switch 620 may prevent the movable element 224 from contacting and/or from abutting the first end 215 of the compartment 210. The switch 620 may absorb, may diffuse and/or may attenuate light emitted within the interior 222 of the compartment 210. The switch 620 may reduce, may minimize and/or may prevent diffraction of light emitted within the interior 222 of the compartment 210.

In an embodiment, a magnet 621 may be attached to and/or connected to the compartment 210 for positioning the switch 620 within the interior 222 of the compartment 210. The magnet 621 may exert a magnetic force on the switch 620 to maintain, to secure and/or to position the switch 620 within the interior 222 of the compartment 210. As a result, the switch 620 may be attached to and/or may be connected to the compartment 210 via the magnet 621. It should be understood that the magnet 621 may be any magnet which may exert magnetic forces to position the switch 620 within the interior 222 of the compartment 210 as known to one of ordinary skill in the art.

An insulator 622 may be located between the switch 620 and the surface 614 of the compartment 210 for electrically isolating the switch 620 from the compartment 210. In an embodiment, the insulator 622 may attach and/or may connect the switch 620 to the surface 614 of the compartment 210. Further, the insulator 622 may be made from a material which may have, for example, an adhesive characteristic for attaching and/or for connecting the switch 620 to the surface 614 of the compartment 210. As a result, the switch 620 may be positioned within the interior 222 of the compartment 210 via the insulator 622. The insulator 622 may absorb, may diffuse and/or may attenuate light emitted within the interior 222 of the compartment 210. The insulator 622 may reduce, may minimize and/or may prevent diffraction of light emitted within the interior 222 of the compartment. The present invention should not be deemed as limited to a specific embodiment of the insulator 622

Figure 9:
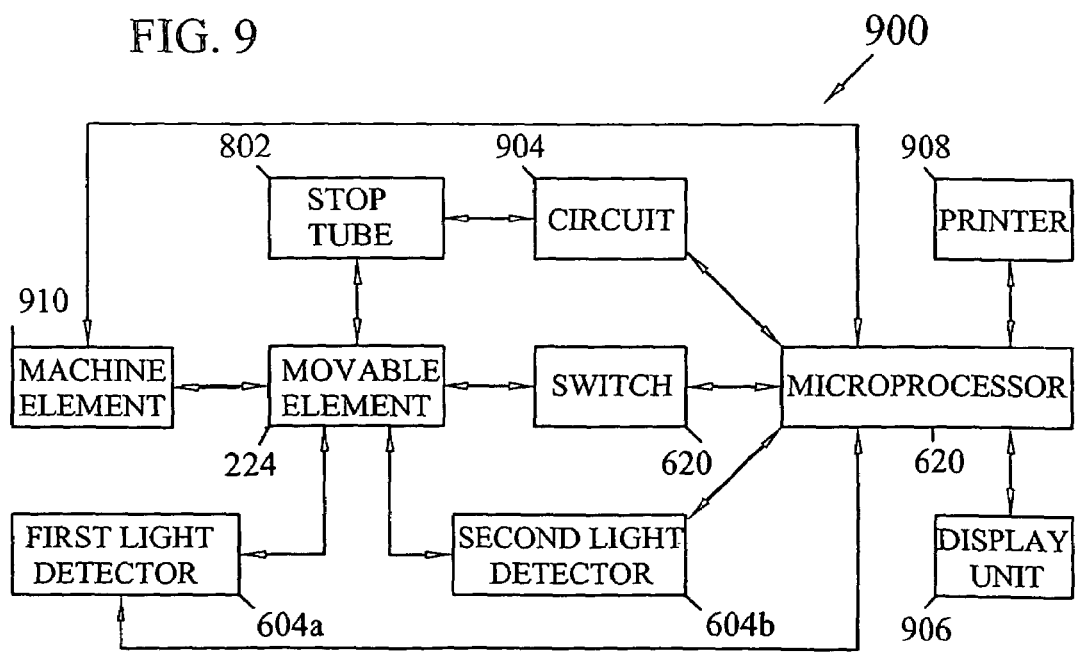
FIG. 9 illustrates a black box diagram of a system in an embodiment of the present invention.

In an embodiment, the switch 620 may be, for example, a mechanical switch for detecting that the movable element 224 may be located at the first position P' or at the second position P''' within the interior 222 of the compartment 210. In the second position P''', the movable element 224 may contact and/or may abut the switch 620 to move the switch 620 from an opened position to a closed position. The switch 620 may be connected to and/or may be in communication with a microprocessor 902 (as shown in FIG. 9) to determine that the movable element 224 may be located at first position P' and/or at the second position P''' within the interior 222 of the compartment 210. With the switch 620 in the closed position, the microprocessor 902 may identify and/or may determine that the movable element may be located at the second position P''' within the interior 222 of the compartment 210. As a result, the microprocessor 902 may detect that the movable element 224 may be located at the end of and/or at the beginning of the stroke within the interior 222 of the compartment 210 via the closed position of the switch 620.

The rod 14 may move the movable element 224 outwardly with respect to the switch 620 from the second position P''' to the first position P' within the interior 222 of the compartment 210. The rod 14 may separate the movable element 224 from the switch 620 to move the switch 620 from the closed position to the opened position. The microprocessor 902 may identify and/or may determine that the switch 620 may be in the opened position to determine and/or to identify that the movable element 224 may not be in the second position P''' within the interior 222 of the compartment 210. As a result, the microprocessor 902 may detect that the movable element 224 may be at the first position P' between the end of and the beginning of the stroke within the interior 222 of the compartment 210 via the opened position of the switch 620.

In an embodiment, the switch 620 may be, for example, a magnetic switch for detecting that the movable 224 may be at the first position P' or at the second position P''' within the interior 222 of the compartment 210. The switch 620 may have magnetic characteristics which may move the switch 620 from the opened position to the closed position. As a result, the switch 620 may be moved between the opened position and the closed position by interference from magnetic forces of the movable element 224. In an embodiment, the movable element 224 may have a magnet which may, for example, exert the magnetic forces outwardly with respect to the movable element 224 for moving the switch 620 to the closed position. In an embodiment, the movable element 224 may be made from a non-conductive material and the surface 614 of the movable element 224 may be made from, for example, a magnet. As a result, the surface 614 of the movable element 224 may exert the magnetic forces outwardly with respect to the surface 614 of the movable element for moving the switch 620 to the closed position.

The rod 14 may move the movable element 224 to the second position P''' which may be adjacent to the switch 620 and/or the insulator 622 within the interior 222 of the compartment 210. As a result, the magnetic force of the movable element 224 or the surface 614 of the movable element 224 may interfere with the magnetic characteristics of the switch 620 to move the switch 620 from the opened position to the closed position. The microprocessor 902 may be programmed to identify and/or to determine that the switch 620 may be in the closed position to detect that the movable element may be located at the second position P'''. As a result, the microprocessor 902 may detect that the movable element 224 may be at the end of or at the beginning of the stroke within the interior 222 of the compartment 210 via the closed position of the switch 620.

The rod 14 may move the movable element 224 outwardly with respect to the switch 620 from the second position P''' to the first position P' within the interior 222 of the compartment 210. In the first position P', the movable element 224 and/or the surface 614 of the movable element 224 may not exert the magnetic forces on the switch 620 to maintain the switch 620 in the closed position. Further, the magnetic forces of the movable element 224 and/or of the surface 614 of the movable element 224 may not interfere with the magnetic characteristics of the switch 620 for moving the switch 620 from the closed position to the opened position. As a result, the switch 620 may move from the closed position to the opened position with the movable element 224 in the first position P'.

The microprocessor 902 may be programmed to identify and/or to determine that the switch 620 may be in the opened position to detect that the movable element 224 may not be in the second position P''' within the interior 222 of the compartment 210. As a result, the microprocessor 902 may detect that the movable element 224 may be at the first position P' between the end of the stroke and the beginning of the stroke within the interior 222 of the compartment 210 via the opened position of the switch 620.

In an embodiment, a stop tube 802 which may be connected to and/or may be attached to the insulator 622 within the interior 222 of the compartment 210 as shown in FIG. 8. As a result, the stop tube 802 may be located within the interior 222 of the compartment 210. The stop tube 802 may be adjacent to the first end 215 of the compartment 210 for detecting that the movable element 224 may be in the second position P''' within the interior 222 of the compartment 210. The stop tube 802 may be attached to and/or may be connected to the surface 614 via the insulator 622. The stop tube 802 may prevent the movable element 224 from contacting and/or from abutting the first end 215 of the compartment 210. The stop tube 802 may absorb, may diffuse and/or may attenuate light emitted within the interior 222 of the compartment 210. The stop tube 802 may reduce, may minimize and/or may prevent diffraction of light emitted within the interior 222 of the compartment 210.

The stop tube 802 may have a cap 804 which may be attached to and/or may be connected to the stop tube 802. The cap 804 may extend outwardly from the stop tube 802 into the interior 222 of the compartment 210. The cap 804 and/or the stop tube 802 may be adjacent to the second position P''' of the movable element 224 within the interior 222 of the compartment 210. As a result, the movable element 224 and/or the surface 614 of the movable element 224 in the second position P''' may abut and/or may contact the stop tube 602 and/or the cap 604.

The stop tube 802 and/or the cap 804 may be electrically isolated from the compartment 210 via the insulator 622 within the interior 222 of the compartment 210. Further, the stop tube 602 and/or the cap 604 may be electrically isolated from the end cap 602 via the insulator 222. Moreover, the cap 604 may absorb, may diffuse and/or may attenuate light emitted within the interior 222 of the compartment 210. The cap 604 may reduce, may minimize and/or prevent diffraction of light emitted within the interior 222 of the compartment 210.

The stop tube 802 and/or the cap 804 may be made of a material which may have, for example, first metallic characteristics. As a result, the stop tube 602 and/or the cap 604 may have a first potential capacitance value which may correspond to the first metallic characteristics of the stop tube 602 and/or the cap 604, respectively. The present invention should not be deemed as limited to a specific embodiment of the material of the stop tube 602 and/or of the cap 604.

The stop tube 802 and/or the cap 804 may be connected to circuit 904 (as shown in FIG. 9) and/or to the microprocessor 902. The circuit 904 may be located between microprocessor 902 and the stop tube 802 and/or the cap 804 as illustrated in FIG. 9. As a result, the circuit 904 may have a first total capacitance value which may correspond to and/or may be based on the first potential capacitance value of and/or the metallic characteristics of the stop tube 602 and/or the cap 604. In an embodiment, the movable element 224 and/or the surface 614 of the movable element 224 may be made of a material which may have, for example, second metallic characteristics. As a result, the movable element 224 and/or the surface 614 of the movable element 224 may have a second potential capacitance value which may correspond to the second metallic characteristics of the movable element 224 and/or of the surface 614 of the movable element 224, respectively. The second potential capacitance of the movable element 224 and/or of the surface 614 of the movable element 224 may be greater than or less than the first potential capacitance of the stop tube 802 and/or the cap 804. In an embodiment, the stop tube 802 may be nonconductive and the surface 614 of the movable element 224 may have the second metallic characteristics. The present invention should not be deemed as limited to a specific embodiment of the material of the movable element 224 and/or the surface 614 of the movable element 224.

The rod 14 may move the movable element 224 to the second position P''' within the interior 222 of the compartment 210. The movable element 224 and/or the surface 614 of the movable element 224 may contact and/or may abut the cap 804 and/or the stop tube 802. As a result, the first total capacitance value of the circuit 904 may be increased to a second total capacitance value for the circuit 904. A difference between the first total capacitance value and the second total capacitance value (collectively known hereinafter as "the total capacitance values") for the circuit 904 may correspond to and/or may be based on the second potential capacitance value of the movable element 224 and/or of the surface 614 of the movable element 224.

The microprocessor 902 may be programmed to detect the difference between the total capacitance values of the circuit 904. The microprocessor 902 may be programmed to determine and/or to identify that the movable element 224 may be located at the second position P''' via the difference between the total capacitance values of the circuit 904. As a result, the microprocessor 902 may detect and/or may determine that the movable element 224 may be located at the end of the stroke and/or at the beginning of the stroke within the interior 222 of the compartment 210 via the difference between the total capacitance values of the circuit 904. At the first position P', the movable element 224 and/or the surface 614 of the movable element 224 may not abut and/or may not contact the cap 804 and/or the stop tube 802. As a result, the circuit 904 may have the first total capacitance value. The microprocessor 902 may be programmed to identify and/or to determine that the movable element 224 may be located at the first position P' between the end of and the beginning of the stroke via the first total capacitance value of the circuit 904.

The microprocessor 902 may be programmed to identify and/or to determine that the movable element 224 and/or the rod 14 may experience an impediment and/or a failure within the interior 222 of the compartment 210 via the difference between the total capacitance values of the circuit 904. In an embodiment, the impediment and/or the failure may be caused from the rod 14 being side loaded as the rod 14 moves the movable element 224 within the interior 222 of the compartment 210. As a result, a concentric shape of the rod 14 may become a non-concentric shape from wear to and/or damage to the rod 14 and/or to the movable element 224. The impediment and/or the failure of the movable element 224 and/or the rod 14 within the interior 222 of the compartment 210 may cause the movable element 224 to be inoperable and/or to be incapable of moving from the first position P' to the second position P'''. The microprocessor 902 may prevent the impediment and/or the failure of the movable element 224 and/or the rod 14 within the interior 222 of the compartment 210 by detecting the difference of the total capacitance values of the circuit 904.

The light source 226 may be attached to, may be connected to and/or may be positioned on the first side 613 of the platform 612. As a result, the light source 226 may extend inwardly with respect to the interior 222 of the compartment 210 as shown in FIGS. 6 and 8. The light source 226 may be located between and/or may be positioned between the insulator 622 within the interior 222 of the compartment 210. The light source 226 may be located between and/or may be position between switch 620 within the interior 222 of the compartment as shown in FIG. 6. The light source 226 may be located between and/or may be position between the stop tube 802 within the interior 222 of the compartment 210 as shown in FIG. 8.

The light emitting portion 232 of the light source 226 may transmit, may project and/or may emit light into the interior 222 of the compartment 210. As a result, light from the light source 226 may be transmitted into the interior 222 of the compartment 210 from the platform 612 of the end cap 602. The light transmitted into the interior 222 of the compartment 210 may be transferred to, may be transmitted to and/or may projected into the interior 610 of the end cap 602 from the interior 222 of the compartment 210. As a result, the light within the interior 610 of the end cap 602 may correspond to, may be based on and/or may be associated with the light emitted within the interior 222 of the compartment 210.

The first light detector 604a may be attached to, may be connected to and/or may be positioned on the second side 616 of the platform 612 as shown in FIGS. 6 and 8. The platform 612 may be located between and/or may be positioned between the light source 226 and the first light detector 604a. As a result, the first light detector 604a may be separated from the light source 226 by the platform 612 of the end cap 602. The platform 612 may prevent and/or may block the light being transmitted by the light source 226 from being directed towards or inwardly with respect to the first light detector 604a. In an embodiment, the cover 233 of the light source 226 may prevent and/or may block the light being transmitted by the light source 226 from being directed towards or inwardly with respect to the first light detector 604a.

In an embodiment, the second light detector 604b of the system 600 may be attached to, may be connected to and/or may be adjacent to the interior walls 608 of the end cap 602 as shown in FIG. 6. The second light detector 604b may be located between and/or may be positioned on the interior walls 608 of the end cap 602 between the platform 612 and the bottom surface 606 of the end cap 602. The platform 612 may be located between and/or may be positioned between the light source 226 and the second light detector 604b of system 600. As a result, the light source 226 and the second light detector 604b may be separated by the platform 612 of the end cap 602. The platform 612 may prevent and/or may block light being transmitted by the light source 226 from being directed towards or inwardly with respect to the second light detector 604b. In an embodiment, the cover 233 of the light source 226 may prevent and/or may block the light being transmitted by the light source 226 from being directed towards or inwardly with respect to the second light detector 604b.

In an embodiment, the second light detector 604b of the system 800 may be attached to, may be connected to and/or may be adjacent to the bottom surface 606 of the end cap 602 as shown in FIG. 8. The platform 612 may be located between and/or may be positioned between the light source 226 and the second light detector 604b of system 800. As a result, the light source 226 and the second light detector 604b may be separated by the platform 612 of the end cap 602. The platform 612 may prevent and/or may block light being transmitted by the light source 226 from being directed towards or inwardly with respect to the second light detector 604b. Moreover, the second light detector 604b may be directed towards the interior 222 of the compartment and/or the movable element 224.

The light detectors 604a, 604b of the systems 600, 800 may have the detecting portion 234 for detecting and/or for measuring an intensity of the light which may be transmitted by the light source 226. The detecting portion 234 of the light detectors 604a, 604b may be located within, may be directed towards and/or may be positioned within the interior 610 of the end cap 602. The light detectors 604a, 604b may measure, may determine, may identify and/or may detect an intensity of the light emitted within the interior 610 of the end cap 602 via detecting portion 234. Further, the light detectors 604a, 604b may detect, may determine and/or may measure a strength of the light emitted into the interior 222 of the compartment 210 via the detecting portion 234. The intensity of the light within the interior 601 of the end cap 602 may correspond to, may be based on and/or may be associated with an intensity of light within the interior 222 of the compartment 210. As a result, the light detectors 604a, 604b may measure, may determine, may identify and/or may detect the intensity of the light within the interior 222 of the compartment 210 via the intensity of the light within the interior 610 of the end cap 602. The intensity of and/or the strength of the light detected within the interior 610 of the end cap 602 may correspond to the first position P' or the second position P''' of the movable element 224 within the interior 222 of the compartment 210.

The light detectors 604a, 604b may determine that the movable element 224 may be in the first position P' or in the second position P''' within the interior 222 of the compartment 210 via the intensity of light detected within the interior 610 of the end cap 602. Further, the light detectors 604a, 604b may determine and/or may identify that the movable element 224 may be located at the end of and/or at the beginning of the stroke via the intensity of the light detected within the interior 610 of the end cap 602. Moreover, the light detectors 604a, 604b may determine that the movable element 224 may be located at the first position P' between the end of and the beginning of the stroke via the intensity of the light detected within the interior 610 of the end cap 602.

In an embodiment, a driver (not shown in the figures) may be connected to and/or may be in communication with the light source 226 to maintain, to stabilize and/or to control the light emitted from the light source 226 into the interior 222 of the compartment 210 and/or the interior 610 of the end cap 602. As a result, the light emitted by the light source 226 may be, for example, constant, consistent, uniform and/or continuous. The light emitted from the light source 226 may have a color, such as, for example, red, yellow, green, blue or white for illuminating the interior 222 of the compartment 210. The present invention should not be deemed as limited to a specific embodiment of the color of the light emitted from the light source 226.

In an embodiment, the bottom surface 606 of the end cap 602 in the system 600 may have reflective characteristics for reflecting the light emitted within the interior 610 of the end cap 602 towards the light detectors 604a, 604b. In an embodiment, the bottom surface 606 may be a reflective surface, such as, for example, a mirror and/or the like. The bottom surface 606 may reflect, may diffuse, may attenuate and/or may focus the light within the interior 610 of the end cap 602 inwardly with respect to the light detectors 604a, 604b within the interior 610 of the end cap 602. As a result, the light detectors 604a, 604b of the system 600 may measure and/or may detect the intensity of the light within the interior 610 of the end cap 602 via the reflective surface 606 of the end cap 602.

The light within the interior 222 of the compartment 210 which may not be absorbed, which may be diffused by and/or which may be attenuated by the surface 614 of the compartment 210 and/or of the movable element 224 may illuminate the interior 610 of the end cap 602. As a result, the light within the interior 610 of the end cap may correspond to the light not absorbed by, diffused by and/or attenuated by the surface 614 of the compartment 210 and/or of the movable element 224.

The intensity of the light within the interior 610 of the end cap 602 may correspond to and/or may be based on the intensity of the light not absorbed by, diffused by and/or attenuated by the surface 614 of the compartment 210 and/or of the movable element 224. The intensity of the light within the interior 610 of the end cap 602 may correspond to and/or may be based on the first position P' and/or the second position P''' of the movable element 224 within the interior 222 of the compartment 210. As a result, the light detectors 604a, 604b may determine that the movable element 224 may be at the first position P' or at the second position P''' based on the intensity of the light detected within the interior 610 of the end cap 602.

In an embodiment, a tab 626 may be attached to, may be formed on and/or may be connected to the movable element 224 for preventing the light transmitted from the light emitter 226 from illuminating the interior 222 of the compartment 210. The tab 626 may be located between the movable element 224 and the platform 612 of the end cap 602. At the second position P''', the tab 626 of the movable element 224 may surround and/or may enclose the light source 226 on the platform 612 of the end cap 602. The light being transmitted from the light source 226 may be prevented from illuminating and/or from entering the interior 222 of the compartment 210 via the tab 626 of the movable element 224. As a result, the light detectors 604a, 604b may not detect light within the interior 222 of the compartment 210 and/or within the interior 610 of the end cap 602 with the movable element 224 located at the second position P'''.

The microprocessor 902 may be programmed to determine that the tab 626 of the movable element 224 may prevent the light transmitted by the light source 226 from illuminating the interior 222 of the compartment 210 via the light detectors 604a, 604b. As a result, the microprocessor 902 may identify and/or may determine that the movable element 224 may be located at the second position P''' via the light detectors 604a, 604b. Moreover, the microprocessor 902 may detect that the movable element 224 may be located at the end of and/or the beginning of the stroke within the interior 222 of the compartment 210 via the light detectors 604a, 604b.

FIG. 9 illustrates, in a black box diagram, an embodiment of a system 900 of the present invention. The system 900 may have the light detectors 604a, 604b which may determine, may measure and/or may identify the intensity of the light within the interior 610 of the end cap 602 that may not be absorbed, may be diffused and/or may be attenuated by the surface 614 of the movable element 224 and/or of the compartment 210 within the interior 222 of the compartment 210. As a result, the microprocessor 902 may detect that the movable element may be located in the first position P' or in the second position P''' within the interior 222 of the compartment 210 via the light detectors 604a, 604b.

The microprocessor 902 may detect that the movable element 224 may be located in the first position P' or in the second position P''' within the interior 222 of the compartment 210 via the switch 620. Alternatively, the microprocessor 902 may determine and/or may identify that the movable element 224 may be located in the first position P' or in the second position P''' within the interior 222 of the compartment 210 via the stop tube 802, the cap 804 and/or the circuit 904. As a result, the microprocessor 902 may detect that the movable element 224 may be located at the end of and/or the beginning of the stroke within the interior 222 of the compartment 210 via the stop tube 802 and the circuit 904, the switch 620 and/or the light detectors 604a, 604b.

An output signal from the light detectors 604a, 604b may be transmitted to a microprocessor 902 for signal interpretation and/or processing. The microprocessor 902 may determine, may identify and/or may detect that the movable element 224 may be located at the first position P' and/or the second position P''' within the interior 222 of the compartment 210. As a result, the microprocessor 902 may locate the movable element 224 within the interior 222 of the compartment 210 based on the intensity of the light that may not be absorbed by, may be diffused and/or may be attenuated by the surface 614 of the movable element 224 and/or of the compartment 210.

The microprocessor 902 may be programmed to operate, to activate and/or to deactivate the machine element 910 to move the movable element 224 to the first position P' and/or the second position P''' within the interior 222 of the compartment 210. The machine element 910 may be connected to and/or may be attached to the movable element 224 via the rod 14. The microprocessor 902 may instruct and/or may control the machine element 910 for moving and/or for positioning the movable element 224 to the first position P' and/or to the second position P'''. As a result, the machine element 910 may move the movable element 224 to the first position P' or to the second position P''' within the interior 222 of the compartment 210 via the rod 14.

A display unit 906 and/or a printer 908 may be connected to and/or in communication with the microprocessor 902. The display unit 906 and/or the printer 908 may be located remotely or may be located locally with respect to the microprocessor 902 and/or with respect to the compartment 210. The display unit 906 and/or the printer 908 may display and/or may render information and/or data to a user (not shown in the figures) which may relate to the first position P' of the movable element 224, the second position P''' of the movable element 224, the intensity of the light within the interior 610 of the end cap 602 and/or the intensity of the light within the interior 222 of the compartment 210. The information and/or the data may be display in one or more charts, one or more graphs, one or more tables and/or the like. It should be understood that the display unit 906 and/or the printer 908 may be any display unit and/or any printer, respectively, that may be capable of displaying and/or rendering the information and/or the data to the user.

The various embodiments of the present invention may be operated by any power supply known to one of ordinary skill in the art. In addition, the various embodiments may be operated in and/or may be operated from remote locations through the use of an electric generator, a pressurized air line, or the like.

The movable element 224 may contact the switch 620 to move the switch 620 between the opened position and/or the closed position which may indicate and/or may determine that the movable element 224 may be at the end and/or at the beginning of the stroke. Alternatively, the movable element may contact the stop tube 802 to increase a total capacitance of the electrical circuit 904 which may indicate and/or may determine that the movable element 224 may be at the end of and/or at the beginning of the stroke. The microprocessor 902 may be connected to the switch 620 or the electrical circuit 904 to detect that the movable element 224 may be at the end of and/or at the beginning of the stroke.

The tab 626 may be formed on the movable element 224 to prevent the light from illuminating the interior 222 of the compartment 210 with the movable element 224 at the end of or at the beginning of the stroke. The light detectors 604a, 604b may measure an intensity of the light within the interior 610 of the end cap 602 which may not be absorbed by, which may be diffused by and/or which may be attenuated by the surface 614 of the movable element 224 and/or of the compartment 210. The intensity of the light detected within the interior 610 of the end cap 602 may correspond to the first position P' or to the second position P''' of the movable element 224 within the interior 222 of the compartment 210.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for detecting an end of a stroke or a beginning of the stroke, the system comprising:
    a compartment having a body defining an interior wherein the body has an interior surface and a length defined between a first end and a second end of the compartment wherein the compartment has a movable element within the interior of the compartment wherein the movable element moves within the interior of the compartment between a first position and a second position wherein the second position is adjacent to the first end of the compartment;
    a tube connected to the interior surface wherein the tube is located at the first end of the compartment and further wherein the movable element has a capacitance value and the tube has a capacitance value wherein the capacitance value of the tube is different than the capacitance value of the movable element;
    an electrical circuit connected to the tube wherein the electrical circuit has a total capacitance value wherein the total capacitance value of the electrical circuit is based on the capacitance value of the tube if the movable element is not in contact with the tube and further wherein the total capacitance value of the electrical circuit is based on the capacitance value of the tube and the capacitance value of the movable element if the movable element is in contact with the tube wherein the movable element is moved to the second position within the interior of the compartment wherein contact of the movable element with the tube connects the movable element to the electrical circuit wherein contact of the movable element with the tube changes the total capacitance value of the electrical circuit;
    a first detector connected to the first end of the compartment wherein the first detector determines an intensity of light emitted within the interior of the compartment wherein the intensity of the light detected within the compartment corresponds to the first position of the movable element within the compartment; and
    a microprocessor connected to the electrical circuit and the first detector wherein the microprocessor detects that the movable element is located at the first position within the compartment via the intensity of the light detected within the interior of the compartment which is not attenuated by the interior surface of the compartment or the movable element wherein the microprocessor detects that the movable element is located at the second position within the interior of the compartment via the second total capacitance of the electrical circuit.

2. The system of claim 1 further comprising:
an insulator connected to the interior surface of the compartment wherein the insulator connects the tube to the interior surface of the compartment.

3. The system of claim 1 further comprising:
a surface formed on the movable element wherein the surface of the movable element or the interior surface of the compartment attenuates and diffuses the light emitted within the interior of the compartment.

4. The system of claim 1 further comprising:
a light source connected to the first end of the compartment wherein the light source emits the light into the interior of the compartment.

5. The system of claim 1 further comprising:
a second detector connected to the first end of the compartment wherein the second detector determines the intensity of the light within the interior of the compartment.

6. The system of claim 1 further comprising:
a tab connected to the movable element wherein the tab prevents the light from illuminating the interior of the compartment.

7. The system of claim 1 wherein an amount of the light emitted within the compartment is attenuated by the interior surface of the compartment wherein the amount of the light attenuated corresponds to the first position of the movable element within the compartment.

8. A system for detecting an end of a stroke or a beginning of the stroke, the system comprising:
    a compartment having a body defining an interior wherein the body has an interior surface and a length defined between a first end and a second end of the compartment wherein the compartment has a movable element within the interior of the compartment wherein the movable element moves within the interior of the compartment between a first position and a second position wherein the second position is adjacent to the first end of the compartment;

an electrical circuit connected to the first end of the compartment wherein the electrical circuit has a total capacitance value wherein the movable element is moved to the second position within the interior of the compartment wherein the movable element connects to the electrical circuit at the second position wherein the movable element increases the total capacitance value of the electrical circuit;

a first detector connected to the first end of the compartment wherein the first detector determines an intensity of light emitted within the interior of the compartment wherein the intensity of the light detected within the compartment corresponds to the first position of the movable element within the compartment;

a microprocessor connected to the electrical circuit and the first detector wherein the microprocessor detects that the movable element is located at the first position within the compartment via the intensity of the light detected within the interior of the compartment which is not attenuated by the interior surface of the compartment or the movable element wherein the microprocessor detects that the movable element is located at the second position within the interior of the compartment via the second total capacitance of the electrical circuit; and a second detector connected to the first end of the compartment wherein the second detector determines the intensity of the light within the interior of the compartment.

9. A system for detecting an end of a stroke or a beginning of the stroke, the system comprising:

a compartment having a body defining an interior wherein the body has an interior surface and a length defined between a first end and a second end of the compartment wherein the compartment has a movable element within the interior of the compartment wherein the movable element moves within the interior of the compartment between a first position and a second position wherein the second position is adjacent to the first end of the compartment;

an electrical circuit connected to the first end of the compartment wherein the electrical circuit has a total capacitance value wherein the movable element is moved to the second position within the interior of the compartment wherein the movable element connects to the electrical circuit at the second position wherein the movable element increases the total capacitance value of the electrical circuit;

a first detector connected to the first end of the compartment wherein the first detector determines an intensity of light emitted within the interior of the compartment wherein the intensity of the light detected within the compartment corresponds to the first position of the movable element within the compartment;

a microprocessor connected to the electrical circuit and the first detector wherein the microprocessor detects that the movable element is located at the first position within the compartment via the intensity of the light detected within the interior of the compartment which is not attenuated by the interior surface of the compartment or the movable element wherein the microprocessor detects that the movable element is located at the second position within the interior of the compartment via the second total capacitance of the electrical circuit; and a tab connected to the movable element wherein the tab prevents the light from illuminating the interior of the compartment.

* * * * *